United States Patent [19]

Flick

[11] 4,164,672

[45] Aug. 14, 1979

[54] COOLING AND INSULATING SYSTEM FOR EXTRA HIGH VOLTAGE ELECTRICAL MACHINE WITH A SPIRAL WINDING

[75] Inventor: Carl Flick, Pittsburgh, Pa.

[73] Assignee: Electric Power Research Institute, Inc., Palo Alto, Calif.

[21] Appl. No.: 825,862

[22] Filed: Aug. 18, 1977

[51] Int. Cl.² .............................................. H02K 9/00
[52] U.S. Cl. .................................. 310/54; 310/60 A; 310/61; 310/179; 310/215
[58] Field of Search ................. 310/45, 215, 65, 60 A, 310/54, 58, 179, 61-64

[56] References Cited

U.S. PATENT DOCUMENTS

| | | | |
|---|---|---|---|
| 2,465,296 | 3/1949 | Swiss | 310/215 |
| 2,707,204 | 4/1955 | Richardson et al. | 310/45 |
| 2,935,859 | 5/1960 | Marvin, Jr. | 310/45 X |

FOREIGN PATENT DOCUMENTS 329670  5/1976  Austria ...................................... 310/179

OTHER PUBLICATIONS

"Neve Losungswege Zum Entwurf grosser Turbogeneratoran bias 2GVA, 60kV," by Gehard Aichholzer, Einglangt, 9-25-74.

*Primary Examiner*—Mark O. Budd
*Attorney, Agent, or Firm*—Flehr, Hohbach, Test, Albritton & Herbert

[57] ABSTRACT

A rotating electrical machine having a winding configuration and insulating system permitting very high voltage operation. The phase coils of the armature winding are arrayed in outwardly spiralling paths about the rotor. Smooth and continuous interphase spaces are formed between the coils for containment of interphase insulating layers. Each interphase layer comprises laminated sheets of permeable material impregnated with a dielectric liquid. The phase coils are formed into inner and outer layers with each coil layer subdivided into a plurality of sections having series connected turns. Spaces between or within the layers contain dielectric liquid which is circulated for cooling the winding. Intracoil insulation between the coil layers is comprised of laminated sheets of permeable material impregnated with a dielectric liquid. The coil sections are coupled in series in a manner to minimize the maximum voltage differentials between the conductors and adjacent coil sections. In another embodiment the turns of each coil are arranged in adjacent layers separated by intracoil insulation material. The adjacent layers are further subdivided into pairs of sublayers formed of parallel conductors separated by a cooling duct through which a dielectric liquid circulates.

18 Claims, 7 Drawing Figures

COOLING AND INSULATING SYSTEM FOR EXTRA HIGH VOLTAGE ELECTRICAL MACHINE WITH A SPIRAL WINDING

CROSS-REFERENCE TO RELATED APPLICATION

Reference is made to application Ser. No. 800,640 filed May 26, 1977 by the inventor hereof and entitled Winding for Electrical Rotating Machine.

BACKGROUND OF THE INVENTION

Theoretical studies have demonstrated the advantages which would accrue from the use of high armature voltage ratings for turbine generators. Among these advantages would be the reduction in armature current and the concomitant reduction in the current-carrying requirements of associated equipment, as well as the possibility of directly connecting the generator to a power transmission or distribution system.

The voltage range for large turbine generators of conventional construction is on the order of 24 kV to 30 kV. In the past, special arrangements were used to achieve up to 36 kV ratings, but these are now principally of historical interest and have not been applied to practical turbine generators. Voltage ratings of up to 500 kV suitable for direct coupling with a transmission system have heretofore not been thought feasible.

The development of superconducting rotors has opened up the opportunity of operating a generator at extra high voltage ratings suitable for direct connection to transmission grids. However, armature windings and insulation systems of conventional design are not capable of operating at such extra high voltage ratings. Thus the need has been recognized for a winding design and insulating system suitable for extra high voltage operation.

OBJECTS AND SUMMARY OF THE INVENTION

It is the general object of the invention to provide a new and improved electrical rotating machine which can operate at extra high voltages such as voltages sufficient for direct connection to the transmission grid of a large power system.

Another object is to provide an armature winding and insulation system for an electrical machine such as a turbine generator which permits operation at extra high voltage ratings such as up to 500 kV.

Another object is to provide an insulating structure for an electrical machine of the type described in which the phase coils are disposed in spiral pancake configurations with smooth and continuous interphase spacing containing continuous layers of an insulating structure of the type having extra high voltage insulating properties.

Another object is to provide an armature winding and insulating system of the type described in which the intracoil spacing forms passageways for the flow of a dielectric liquid for cooling the winding as well as space for laminated insulating structure, intracoil connections and start and finish leads.

Another object is to provide a winding and insulating system of the type described in which the phase coils are formed in layers which in turn are separated into sections, and in which the layers are separated by intracoil spacing occupied by a dielectric insulating structure, passageways for the circulation of a cooling liquid and lead conductors for coupling the coil sections in series. The lead conductors extend along paths in the intracoil spacing in a manner which minimizes the maximum voltage differentials between the conductors and coil sections.

The invention in summary includes an armature winding having a plurality of phase coils each of which includes series-connected turns lying in paths which spiral outwardly about the rotor. Spacing formed between the coils contains interphase insulation means. The interphase insulation includes layers of laminated dielectric liquid-impregnated material. Passageways through which dielectric liquid is circulated as a coolant are also provided within the coils. The phase coils are formed into inner and outer layers each of which is separated into sections. Intracoil spaces are formed between the layers for the placement of insulation means, cooling means, as well as conductors for coupling the coil sections in a manner which minimizes maximum voltage differentials between the coils and conductors. The intracoil insulation means comprises laminated sheets of dielectric liquid-impregnated material.

The foregoing and additional objects and features of the invention will appear from the following description in which the several embodiments of the invention have been set forth in detail in conjunction with the accompanying drawings.

DESCRIPTION OF THE PREFERRED EMBODIMENTS

Figure 1:
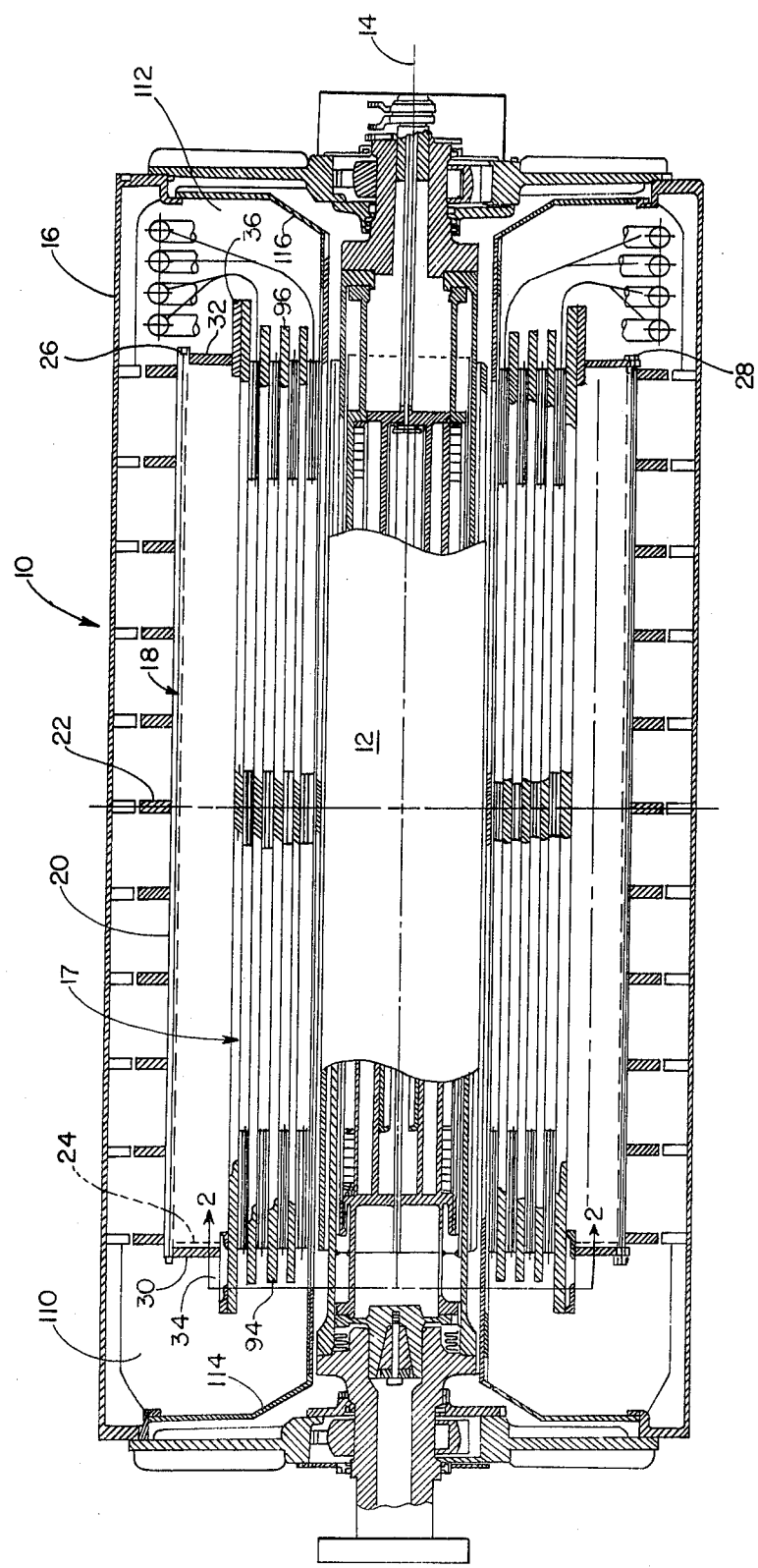
FIG. 1 is an axial sectional view of a turbine generator incorporating the invention.

In the drawings FIG. 1 illustrates generally at 10 an electrical machine incorporating the invention and which comprises a two-pole generator having a rotor 12. While a two-pole electrical machine is described, it is understood that the invention will also have application for machines having four or more poles.

The rotor 12 is turbine-driven and is mounted for rotation about longitudinal axis 14 of an outer frame 16. The construction and operation of the rotor forms no part of this invention and thus need not be described in detail. The rotor preferably is of the superconducting type which establishes a strong rotating magnetic field sweeping across the armature winding 17 of a stator 18 mounted about the rotor. A superconducting rotor of the type which is suitable for use with the invention is that shown in U.S. Pat. No. 3,816,780.

An annular stator shield 20 is mounted about stator winding and is supported by radially projecting ribs 22 which connect with outer frame 16. The stator shield is laminated of a large plurality of thin plates or laminae 24, e.g., 1/50" thickness, formed of a suitable magnetic material such as magnetic silicon iron. Elongate bolts 26, 28 extend through apertures formed in the laminae and end plates 30, 32 for securing the stator shield together. Annular members 34, 36 formed of a suitable non-metalic material are mounted within recesses formed by the enlarged inner bore of the end laminae to form extensions of the shield.

Figure 2:
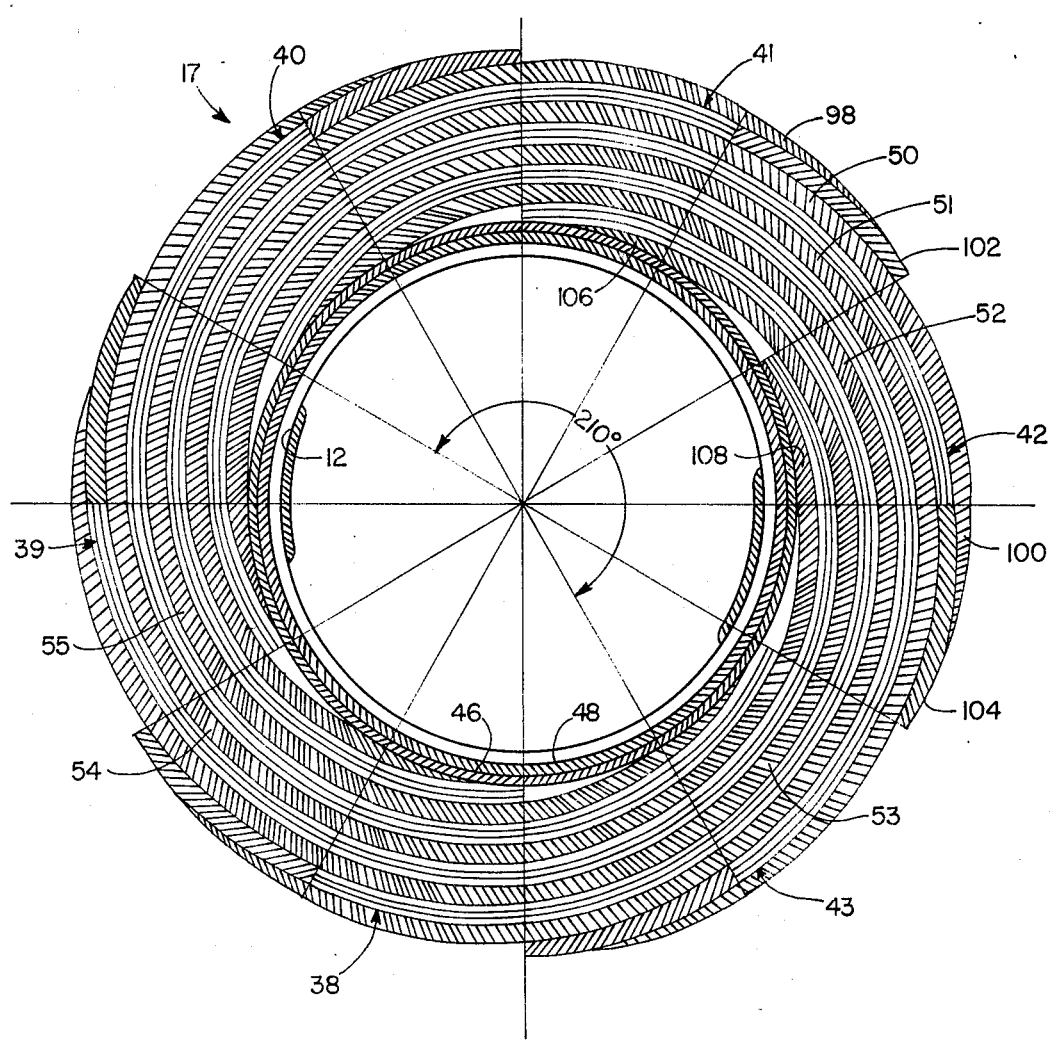
FIG. 2 is a cross-sectional view of the armature winding taken along the line 2—2 of FIG. 1.

Armature winding 17 comprises a plurality, illustrated as six, of phase coils 38–43 (FIG. 2). The individual phase coils are disposed in a spiral pancake configuration in accordance with the disclosure of the aforementioned application entitled Winding For Electrical Rotating Machine. As disclosed therein the six coils are circumferentially positioned at equal intervals about a cylindrical insulating and support tube 46 which in turn is mounted about a cylindrical bore seal tube 48. Each phase coil lies in a path which spirals outwardly through an arc shown as 210° with the outer portion of the coil lying near the outer diameter of the winding where it is supported by the stator shield. The spiral pancake configuration of the coils defines spiral-shaped interphase (i.e. intercoil) spaces 50–55, which are uniformly smooth and continuous.

Figure 3:
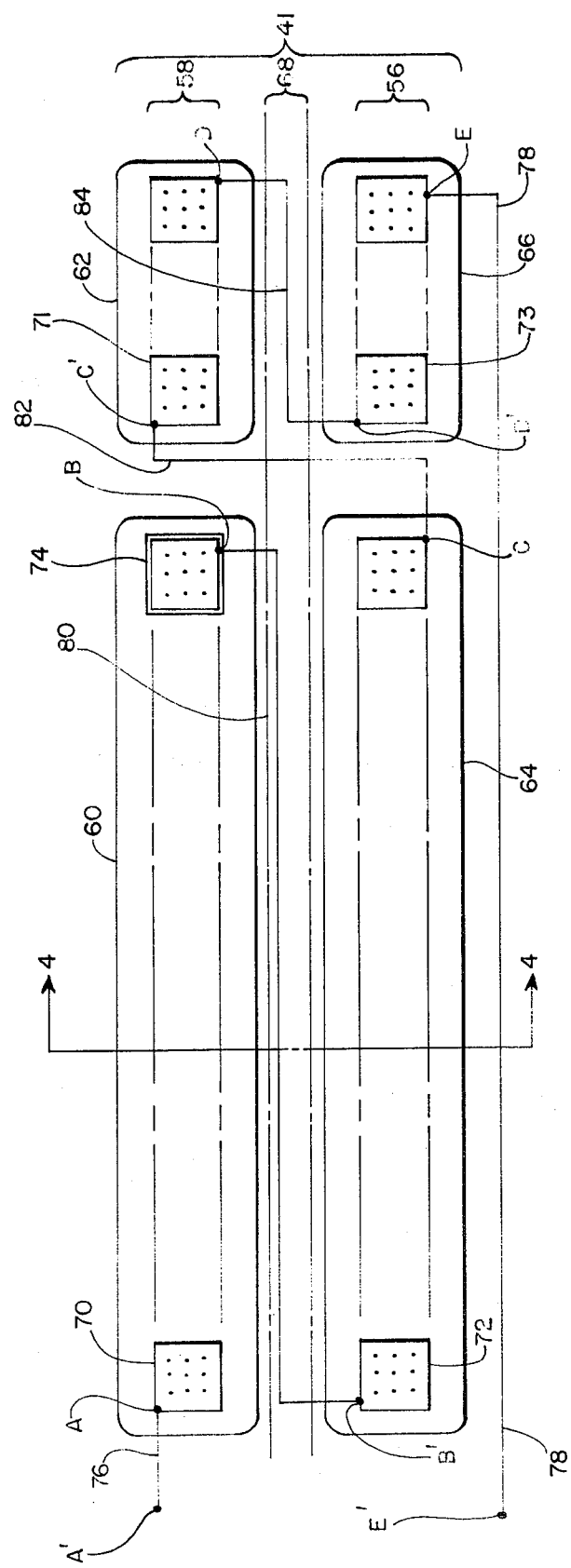
FIG. 3 is a schematic diagram illustrating one arrangement of the sectional coil layers and lead connections for a phase coil of the winding of FIG. 2.

The schematic diagram of FIG. 3 illustrates one construction of phase coil 41 in axial section, and this coil is typical of the six coils. For purposes of dielectric stress control the coil is formed into inner and outer layers 56, 58 which are further subdivided into plural sections. Thus the inner layer 56 is formed into sections 60 and 62 while outer layer 58 is formed into sections 64 and 66. The inner and outer layers are separated by a smooth and continuous intracoil spacing 68. The intracoil spacing is occupied by the intracoil insulation system described below in connection with FIG. 4.

Each coil section comprises a large plurality, e.g., on the order of one-hundred, series-connected turns 70–73. The turns are comprised of a plurality of fine strands of a conductive metal such as copper. The fine stranding minimizes stray losses resulting from exposure of the air gap winding to high flux densities. The strands are mutually insulated with a suitable dielectric coating such as synthetic varnish film. An insulating layer 74 of permeable material such as paper is wrapped about each turn as well as around the coil leads. The strands are transposed sideways at regular intervals or continuously along the length of the turns for purposes of equalizing voltages induced in the strands either by peripheral flux or by radial flux, and thereby suppress currents due to this source.

Optimum distribution of the dielectric stress within each phase winding is provided by the layered and sectionalized coil configuration in a manner which minimizes the maximum voltage differential, and thereby minimizes maximum dielectric stresses, across intracoil spacing and insulation and between the adjacent leads extending along the intracoil spaces. One embodiment of this arrangement is illustrated by the schematic of FIG. 3 where start and finish leads 76, 78 connect respectively with the outer end of outer layer section 60 at point A and the inner end of inner layer section 66 at point E. The lead 78 extends from point E along sections 64, 66 to point E'. A lead conductor 80 connects at point B with the inner end of section 60 and extends along the intracoil spacing where it connects with the outer end of inner layer section 64 at point B'. A lead conductor 82 connects at point C with the inner end of section 64 and extends upwardly for connection at point C' with the outer end of outer layer section 62. The inner end of section 62 connects at point D with a lead conductor 84 which extends along the intracoil space to connect at point D' with the outer end of inner layer section 66.

Assuming that there is a uniform distribution of voltage along all turns of the coil then the relative voltage levels at the points of connection, assuming arbitrary units of voltage, can be assumed as follows: Points A–A' equal 6 units; points B–B' equal 4 units; points C–C' equal 2 units; points D–D' equal 1 unit; points E–E' equal 0 units. Under these assumptions the maximum voltage difference across the intracoil insulation, e.g., between point A and B' or between B and C, is one-third of the 6 unit voltage difference across the phase belt. At the same time the maximum voltage from lead 78 extending from the inner end of the coil to adjacent turns is two-thirds of the phase belt voltage difference. Thus, there are four units of voltage difference between lead 78 and point B'. With a series-star connected winding, the voltage across each phase belt is one-half the phase voltage rating of a machine. Thus the maximum voltage stressing the lead insulation would be one-third of the BIL (Basic Inpulse Level) for the insulating material, thereby requiring a single thickness of lead insulation equal to one-third or less of the interphase insulation.

Figure 5:
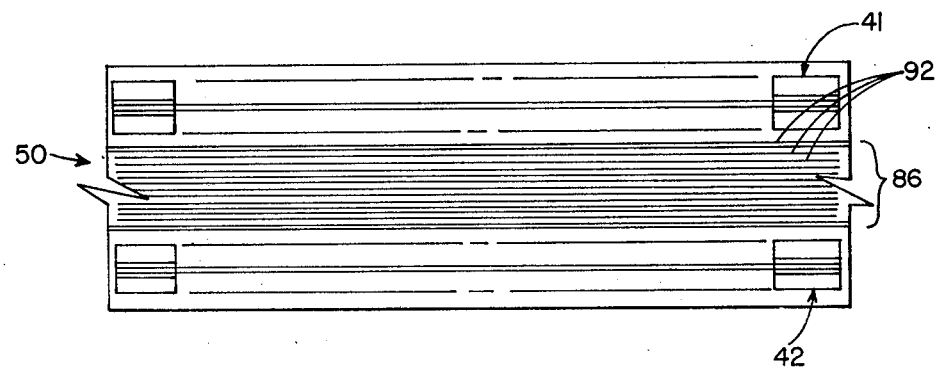
FIG. 5 is a cross-sectional view of the interphase insulation system between two coils of the winding of FIG. 2.

The spiral pancake coil geometry provides smooth and continuous interphase spaces for the placement of interphase insulation of the character having a very high dielectric strength. The insulation within interphase space 50 shown in FIG. 5 between the coils 41 and 42 is typical and comprises a laminated layer 86 of dielectric liquid-impregnated material. Insulating layer 86 is formed of superposed sheets 92 having a permeable structure, e.g., cellulosic material such as pressboard, paper, or a combination of both, or it could be a synthetic fiber such as nylon or dacron. The thickness of the sheets, and the number of sheets in each layer, would depend upon the electrical potential to insulate against for a particular generator application. For example, sheet thickness can range from 1/16" to ⅛", and the number of laminae in each layer can be on the order of twenty sheets or more.

For creepage control the axial ends 94, 96 of the laminated layers project beyond the coil ends (FIG. 1) and the outer radial edges 98, 100 of the layers overlap the underlying edges of the coils (FIG. 2). The outer edges of the layers are also tapered by cutting the component sheets to different widths so that the outer circumference of the armature winding conforms to stator shield 20. Strips 102, 104 of impregnated insulating material are fitted beneath the tapered edges adjacent the outer sides of the coils. The inner edges 106, 108 of the laminated layers are also tapered to conform with the diameter of inner cylinder 46.

The dielectric liquid which is impregnated in the laminated layers preferably is a water-free transformer grade oil. The interphase spaces are open at axial ends of the winding to permit the free flow of oil from and into oil-filled chambers 110, 112 at opposite ends of the machine. The chambers are sealed by extensions 114, 116 mounted on opposite ends of bore seal tube 48. The outer peripheries of the extensions are mounted within the circular ends of frame 16. Suitable pump apparatus, not shown, is provided for circulating the oil from the chambers, along the interphase and intracoil spaces, to an external radiator (not shown) for cooling, and then back to the chambers.

Figure 4:
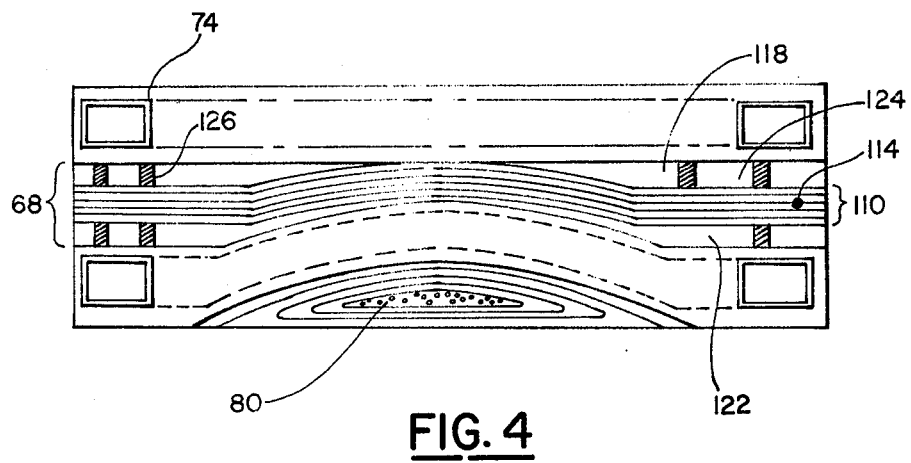
FIG. 4 is a cross-sectional view taken along the line 4—4 of FIG. 3 illustrating the intracoil insulating system.

As shown in FIG. 4 for the typical coil 41, a layer 110 of intracoil insulation is provided in each of the intracoil spaces 68. Each insulation layer comprises a layer of laminated sheets 114 formed of dielectric liquid-impregnated material. Preferably the sheets are the oil-impregnated permeable material previously described for interphase insulating layer 86. The number of sheets and sheet thickness in each intracoil layer would depend upon the electrical potential to be insulated against. The dielectric liquid impregnated in the layer preferably is transformer grade oil. Means forming oil passageways 118-122 on opposite sides of the layer are provided. Passageway 118 is typical and comprises a series of ducts 124 formed by a plurality of spacer blocks 126 secured to the sheets 114 at regular intervals by suitable means such as an adhesive. The volume between the sheets and spacer blocks provides a passageway for the flow of oil into and from the intracoil spaces for cooling the winding.

The intracoil insulation layers accommodate containment of the intracoil connections and start and finish leads within intracoil space 68 without violating the integrity of the insulation. Thus, the lead 80 is flattened and positioned along one side of the coil. The spacer blocks in the passageways 122 and 118 along the path of the lead are removed to permit the underlying portion of the coil portion and of the laminated layer to bulge upwardly.

Dielectric stress in the air gap surrounding the rotor can be controlled by a grounded electrostatic shield provided on bore seal tube 48. Strips of electrical conducting or semi-conductive material, not shown, are mounted at or near the outer surface of the tube, with the strips being grounded. The shield could comprise very thin layers of conductive or semi-conductive paint arrayed in thin axial strips alternately connected to opposite ends of the tube. Surface creepage between the strips is controlled by suitable means such as imbedment of the strips within the surface of the tube. The electrostatic shield serves to exclude electric fields both from the air gap and from the main thickness of the bore seal, which therefore need not have the high insulating properties which would otherwise be required.

Figure 6:
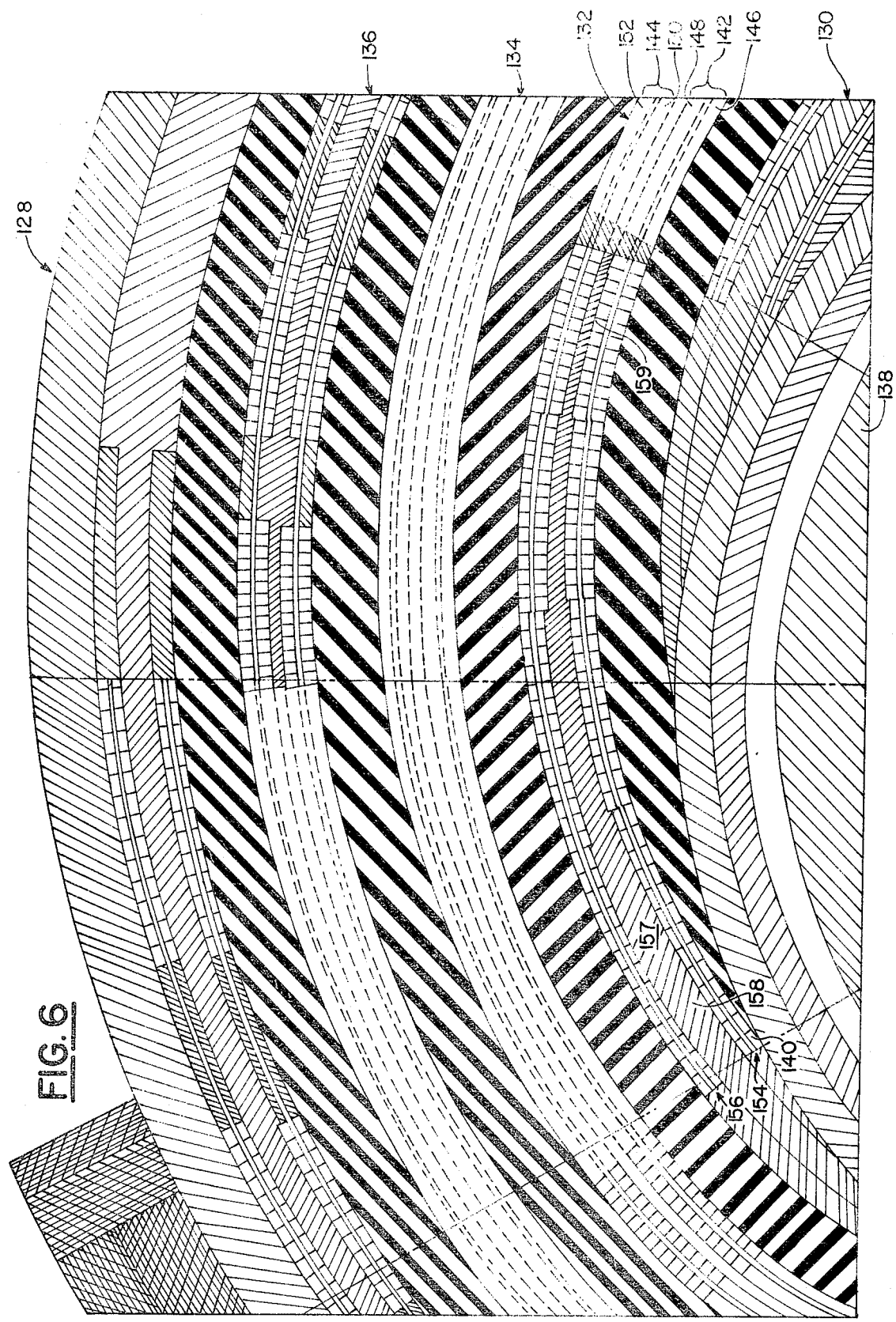
FIG. 6 is a partial cross-sectional view of the armature winding of another embodiment of the invention.

Another embodiment of the invention is illustrated in FIG. 6 which depicts a partial cross-sectional view of an armature winding 128 for a rotating electrical machine. The winding comprises a plurality, e.g., six, of phase coils 130, 132, 134 and 136 which are arrayed in outwardly spiralling paths about the rotor 138 in the manner described above for the embodiment of FIG. 1. The construction of coil 132 is typical and comprises a plurality of paper-insulated turns 140, each of which is formed of fine copper strands that are mutually insulated with a suitable dielectric coating such as synthetic varnish film. The turns of each coil are arranged in inner and outer layers, 142, 144 each such layer being further subdivided into pairs of sub-layers 146, 148 and 150, 152 formed of parallel conductors. The sub-layers of each pair are separated by ducts 154, 156 through which a suitable dielectric liquid such as transformer grade oil is circulated for cooling and insulation purposes. The inner and outer layers of each coil are separated by intracoil spaces occupied by insulation 157 comprising dielectric liquid-impregnated material such as the permeable sheets described above for the embodiment of FIG. 1.

The conductors of the sub-layers associated with each liquid duct are wound in the same direction and are, in effect, electrically in parallel. The voltage of any one conductor is therefore essentially the same as that of its mate on the other side of the duct so that the potential difference across the duct is close to zero everywhere between the layers of conductors. The liquid in each duct is thus shielded against dielectric stress.

The turn-to-turn voltage distribution between the inner and outer layers 142, 144 is sustained by forming the intracoil insulation 157 in a stepped configuration progressing from the thick segment 158 separating the outer turns to the relatively thinner segment 159 separating the inner turns. The conductor aspect ratio (height/width) is varied between the segments to maintain approximately constant conductor cross section. The intracoil insulation could also vary continuously (i.e., stepless) in thickness from the outer to the inner turns with the cross-sectional shapes of the conductors being made conformable. As a further refinement the conductor cross section could change continuously or at intervals as determined by the surface area in contact with the coolant liquid.

Figure 7:
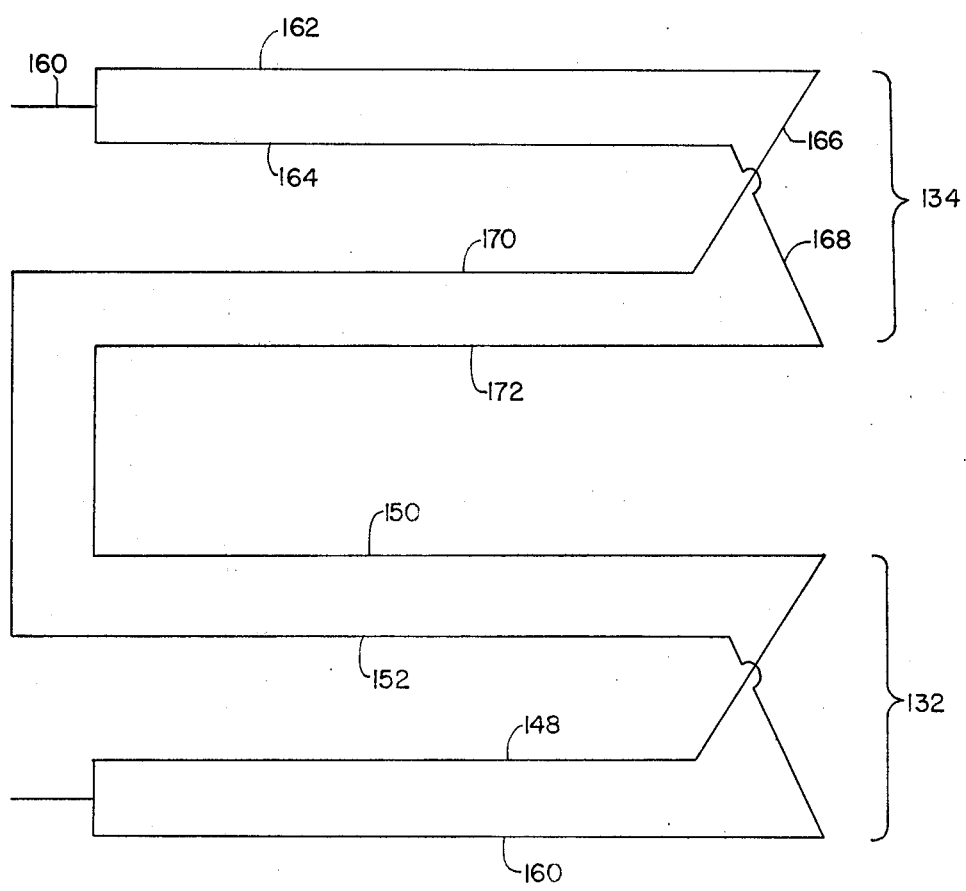
FIG. 7 is a schematic diagram illustrating one arrangement for interconnecting the conductors of two coils for the winding of FIG. 6.

FIG. 7 illustrates in schematic form one arrangement for interconnecting two phase coils 132, 134 of the winding 128 for the embodiment of FIG. 6. Successive turns of the layers are wound in the proper sense so that the two halves of each coil are additive. For example, starting at the external lead end 160 on the outside of coil 134 the successive turns spiral inward in the first pair of sub-layers 162, 164, then cross-connect at internal lead ends 166, 168 to the other pair of sub-layers 170, 172 and then spiral back outward in the latter sub-layers. The finish lead is consequently also on the outside of the coil, and no problems with lead crossing exist. The cross connection or transposition internally at 166, 168 assures that each parallel path contains an equal number of conductors in the same relative positions.

From the foregoing it will be seen that there has been provided a novel winding and insulation system for an extra high voltage electrical machine. The spiral pancake configuration of the winding provides smooth and continuous interphase and intracoil spacing containing insulating layers having high dielectric strength. The air gap armature winding configuration permits the ground plane to be moved out to the stator shield so that very high voltage operation is feasible. The voltage ratings which can be achieved with the invention permit direct connection of the generator to the transmission grid, thereby eliminating losses associated with the transformer, as well as better fault clearing capability. The higher voltage operation can be expected to produce other benefits such as reduced cost of the generator main bus, and easier application of cable connections to remote transformers.

While the foregoing embodiments are at present considered to be preferred, it is understood that numerous variations and modifications may be made therein by those skilled in the art and it is intended to cover in the appended claims all such variations and modifications as fall within the true spirit and scope of the invention.

What is claimed is:

1. An insulating structure for use in a rotating electrical machine with a high voltage rating on the order of 500 kV and having an armature winding comprised of phase coils disposed in paths which spiral outwardly about the axis of rotation of the machine with interphase spaces formed between adjacent coils, the insulating structure including the combination of an insulating layer disposed within each interphase space, and at the inner and outer peripheries of the winding, each layer comprising a plurality of superposed sheets formed of a material capable of being impregnated with a dielectric liquid, a dielectric liquid impregnated in the material of the insulating layers, means forming passageways extending between each side of each layer and the coil adjacent thereto, a transformer oil in the passageways in heat exchange contact with the coil surfaces, and means for circulating the oil through the passageways for cooling the coils.

2. An insulating structure as in claim 1 in which the sheet material is a permeable composition.

3. An insulating structure as in claim 1 in which the sheets have a thickness in the range of about 1/16th inch to 1/8th inch with the sheets extending substantially continuously along the interphase spaces.

4. A high voltage armature winding for a rotating electrical machine comprising a plurality of phase coils adapted for connection in an electrical circuit, each coil lying in a path which spirals outwardly about the axis of rotation of the machine with the coils being circumferentially spaced-apart to define continuous interphase spaces there between, each coil comprising inner and outer coil layers which are spaced-apart to define continuous intracoil spaces there between, dielectric insulation means extending along the intracoil spaces, conductor means for connecting the inner and outer layers of each coil in a phase of the electrical circuit, and means forming passageways for directing a flow of dielectric liquid to and from the portions of the intracoil spaces between the sheets and coil layers.

5. A winding as in claim 4 in which the insulation means in the intracoil spaces comprises a plurality of superposed sheets formed of a material capable of being impregnated with a dielectric liquid, a dielectric liquid impregnated into the material of the sheets.

6. A winding as in claim 5 in which the means forming the passageways comprises at least one sheet formed of a dielectric liquid-absorbing material together with spacer means supporting said sheet in spaced-apart relationship to define passageways for the flow of liquid within the coil and between the coil layers.

7. A winding as in claim 6 in which said conductor means includes lead conductors for each coil layer with the lead conductors extending along said passgeway means formed between coil layers and interphase insulation, said spacer means being reduced in thickness along the length of the lead conductors to accommodate the thickness of the latter with the thickness of the sheets within the associated intracoil space.

8. A winding as in claim 7 in which each coil layer is formed of a plurality of sections with each section having a plurality of series-connected turns, each section having end connections, and lead conductor means for coupling the end connections of the sections of each coil in series, said lead conductor means including at least one segment which extends from the end connection of a coil section along a path in the intracoil space adjacent another coil section whereby the maximum voltage differential between the one segment and other coil section is at a minimum.

9. An electrical machine comprising rotor means for establishing a rotating electrical field, an annular stator shield mounted in radially-spaced relationship about the rotor means, an armature winding between the stator shield and rotor means, said winding including a plurality of phase coils each of which includes series-connected turns lying in a path which spirals outwardly about the rotor, said coils being circumferentially spaced-apart to define interphase spaces which spiral outwardly about the rotor means, ground insulation means for electrically grounding the stator shield and the bore seal tube, interphase insulation means in each interphase space, each interphase insulation means comprising a layer of laminated dielectric liquid impregnable material, intracoil insulation means within each phase coil, comprising a second layer of laminated dielectric liquid-impregnable material, means forming passageways for the dielectric liquid in each phase coil, and a dielectric liquid impregnated in the laminated material and disposed in the passageways.

10. An electrical machine as in claim 9 in which opposite ends of the laminated layers extend axially beyond the axial ends of the phase coils for creepage control.

11. An electrical machine as in claim 9 which includes a bore seal tube mounted about the rotor within the inner periphery of the armature winding, means forming sealed chambers at opposite ends of the winding between the bore seal tube and stator shield, with dielectric liquid contained in the chambers for communication into and from the interphase spaces whereby the liquid circulates in heat exchange relationship with the coils for cooling the latter.

12. An electrical machine as in claim 9 in which the turns of each phase coil are each disposed in inner and outer layers separated by a continuous intracoil space, intracoil insulation means within each intracoil space comprising an intracoil layer of laminated flat dielectric liquid-impregnable material, means forming passageways between each intracoil layer and adjacent coil layers, and a dielectric liquid impregnated in the intracoil layer material and disposed in the passageways for cooling the turns.

13. A high voltage armature winding for a rotating electrical machine comprising a plurality of phase coils adapted for connection in an electrical circuit, each coil lying in a path which spirals outwardly about the axis of rotation of the machine with the coils being circumferentially spaced-apart to define continuous interphase spaces there between, each coil comprising inner and outer coil layers which are spaced-apart to define continuous intracoil spaces there between, dielectric insulation means extending along the intracoil spaces, conductor means for connecting the inner and outer layers of each coil in a phase of the electrical circuit, each coil layer comprising a pair of sub-layers which are spaced-apart to define a duct for circulation of a dielectric liquid, each sub-layer comprising turns which are connected electrically in parallel with and wound in the same sense as the turns of the adjacent sub-layers of the pair whereby liquid within the duct is shielded against dielectric stress.

14. A winding as in claim 21 which includes means or a cross connecting in series the internal lead end of one sub-layer of a coil layer with the internal lead end of the sub-layer occupying the same relative position of the adjacent coil layer in each phase coil whereby each parallel conductor path contains an equal number of conductors in the same relative positions.

15. A winding as claim 15 in which the insulation means in said intracoil spaces is formed with a thickness which diminishes in a direction from the outer to the inner turns of each coil for sustaining the turn-to-turn voltage distribution between the inner and outer coil layers.

16. A winding as in claim 13 in which said insulation means has a stepped thickness which diminishes at intervals, and the cross-sectional shapes of the sub-layers change at intervals conformable with the thickness of the adjacent insulation means.

17. An insulating structure for use in a high voltage rotating machine having an armature winding comprised of phase coils disposed in paths which spiral outwardly about the axis of rotation of the machine with interphase spaces formed between adjacent coils, the insulating structure including the combination of an insulating layer disposed within each interphase space, and at the inner and outer peripheries of the winding, each layer comprising a plurality of superposed sheets formed of a material capable of being impregnated with a dielectric liquid, a dielectric liquid impregnated in the matieral of the insulating layers, means forming passageways extending along each layer, and means for circulating the liquid through the passageways for cooling the coils.

18. An insulating structure as in claim 17 in which the interphase spaces are open at the axial end margins of the insulating layers for directing liquid from the axial ends of the machine into and from the passageways.

* * * * *